Nov. 3, 1936.  W. BAUSCH  2,059,767
MANUFACTURE OF OPHTHALMIC LENSES
Filed Oct. 26, 1934
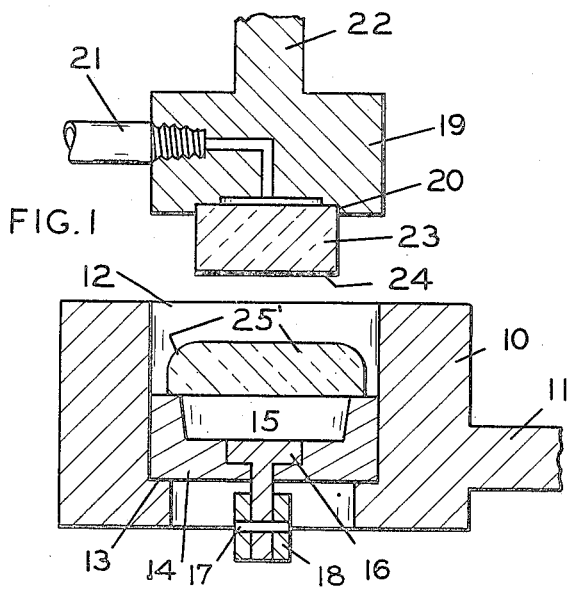
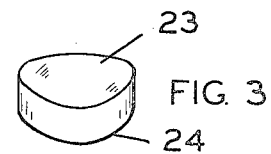
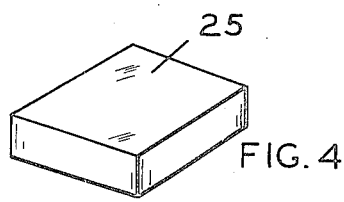
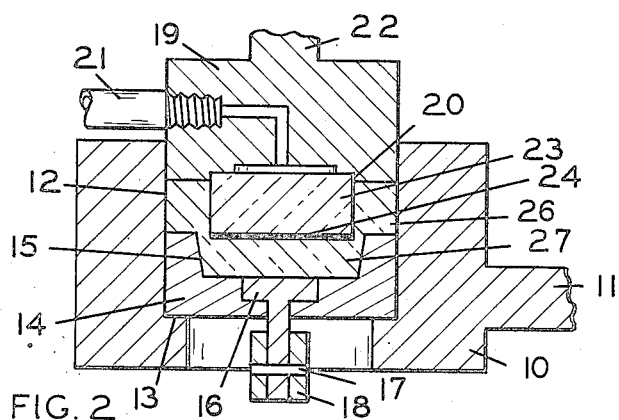
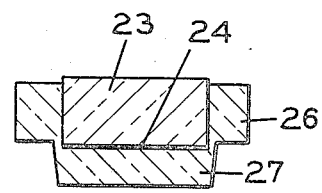
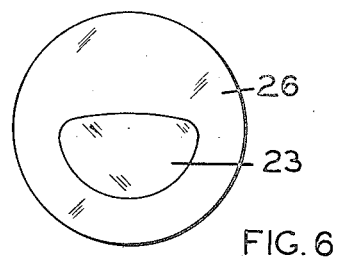
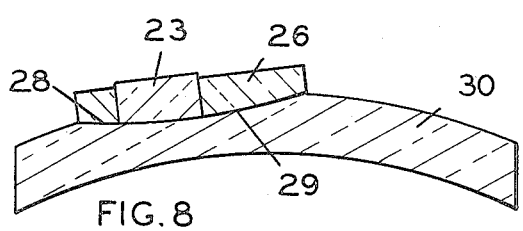
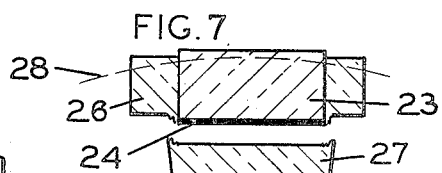
WILLIAM BAUSCH
INVENTOR
BY *J. A. Ellestad*
ATTORNEY Patented Nov. 3, 1936

2,059,767

UNITED STATES PATENT OFFICE 2,059,767

MANUFACTURE OF OPHTHALMIC LENSES

William Bausch, Rochester, N. Y., assignor to Bausch & Lomb Optical Company, Rochester, N. Y., a corporation of New York Application October 26, 1934, Serial No. 750,175

9 Claims. (Cl. 49—82.1)

The present invention relates to the manufacture of fused ophthalmic lenses embodying a fused composite button and more particularly to a method and apparatus for making a fused composite button for use in such manufacture.

One of the objects of the present invention is to improve the manufacture of fused composite ophthalmic lenses. Another object is to provide a new and improved composite button for use in the manufacture of fused multifocal lenses. A further object is to provide a new and improved method and apparatus for making a fused composite button for use in the manufacture of multifocal lenses. A further object is to provide a method and apparatus for inserting a glass segment into a glass carrier member and shaping the glass carrier member in a single operation. These and other objects and advantages result from certain novel features of steps and processes and in certain novel features of construction, arrangement and combination of parts for performing said steps and processes, as will hereinafter be more fully set forth and pointed out in the appended claims.

Referring to the drawing:

Fig. 1 is a vertical sectional view showing the mold in open position.

Fig. 2 is a vertical sectional view showing the mold in closed position.

Fig. 3 is a perspective view of a segment for a multifocal lens.

Fig. 4 is a perspective view of a glass block for a carrier button.

Fig. 5 is a vertical section of the composite button after pressing.

Fig. 6 is a plan view of the composite button.

Fig. 7 is a vertical section of the carrier button showing the excess glass removed.

Fig. 8 is a vertical section showing the composite button fused to the major blank.

One example of my invention is illustrated in the drawing wherein 10 indicates a mold having a handle 11 and having a smooth bore 12 terminating with an internal shoulder 13. A support 14 having a recess 15 is slidable in the bore 12 and normally rests on the shoulder 13. A knockout 16 is slidably mounted in the support 14 normally flush with the bottom of the recess 15. Spaced a short distance below the bottom of the support 14 and pinned at 17 to the knockout 16 is a shoulder 18, the purpose of which will be described later.

A presser member 19, of the same size and shape as the bore 12, has a recess 20 in its lower face which is connected by a conduit 21 to a vacuum pump, not shown. The extension 22 is connected to a suitable press, not shown, for forcing the presser member 19 into the bore 12 of the mold 10.

In practicing my invention a segment 23 is formed and coated on one face with refractory material as indicated at 24. This refractory material may be any substance which will prevent fusion between the face of the segment and the plastic member. The uncoated face is then placed in the recess 20 where it is held by the vacuum as set forth above. The segment 23 is then heated so that it will not crack when pressed into softened glass but is not heated to an extent that would cause it to lose its shape.

The glass block 25 is heated in a furnace until it becomes soft as indicated at 25' and then placed on the support 14. Pressure is then applied to the presser member 19 forcing the segment 23 into the softened glass block 25' and, at the same time, pressing the softened glass block 25' into a circular carrier button 26 and forcing the glass 27, displaced by the segment 23, into the recess 15. The knockout 16 is then tapped to loosen the composite button from the mold and, after only a slight movement, the shoulder 18 abuts the bottom of the support 14 and the composite button is thus removed from the mold. As the segment 23 is not in the center of the composite button, pressure on the knockout 16 would cause the button to tilt and bind in the bore 12, and hence the shoulder 18 is provided on the knockout so that the entire support 14 is used in removing the button from the mold.

The extension 27 is then broken off and the button is ground and polished as indicated at 28 and fused in a countersink 29 in a major blank 30 as is well known. The multifocal lens is then ground and polished in the usual manner.

It is immaterial whether the segment 23 has a higher or a lower softening point than the glass member 25 in fact it usually has a lower softening point than the member. However, the glass member 25 is heated in a furnace until it becomes plastic while the segment 23 is only heated to the point where it will not crack when brought into contact with the softened member 25'. Thus, in operation, the segment is always harder than the member 25'. The refractory material 24 on the segment 23 prevents fusion between the coated face of the segment 23 and the softened glass block 25'. This makes it very easy to remove the extension 27, as the extension readily breaks off as indicated in Fig. 7. It is not essential, however, that the coating of refractory material be used, but in its absence, the lower face of the segment 23 will fuse to the softened block 25' and the extension 27 will have to be sawed or ground off.

From the foregoing it is apparent that I attain the objects of my invention and improve the manufacture of ophthalmic lenses and also provide a new and improved composite button for use in the making of ophthalmic lenses as well as a new and improved method and apparatus for making the button. Various modifications can of course be made without departing from the spirit of my invention.

I claim:

1. An article of manufacture comprising a glass member having a body portion with upper and lower faces, an integral portion extending from one face and a glass element embedded in said member extending through said body portion into said integral portion.

2. An article of manufacture comprising a glass member having a body portion with upper and lower faces, a glass element extending through said member and an extension integrally connected to said member by a thin wall surrounding said element.

3. An article of manufacture comprising a glass member of one refractive index having a body portion with upper and lower faces, an integral portion extending from one face, a glass element of a different refractive index embedded in said member, extending through said body portion into said integral portion, and a coating of refractory material between the face of said element and the integral portion to prevent fusion therebetween.

4. A method of making multifocal lenses which comprises producing a composite button by forming on a segment of glass a continuous bounding wall which is substantially coextensive with the thickness of the segment, rendering plastic a piece of glass of different refractive index and pressing said segment down into the plastic piece of glass with said wall substantially perpendicular to the surface of said piece of glass, forming a polished face on said composite button and fusing said button onto a major member of glass having a refractive index which is substantially the same as said piece of glass.

5. A method of making composite buttons for multifocal lenses which comprises coating a face of a segment of glass with a refractory substance, bringing the coated face of the segment into contact with a plastic body of glass of different refractive index and pressing said segment down into the plastic body.

6. A method of making composite buttons for multifocal lenses which comprises forming a segment of glass with a continuous bounding wall of substantial height, softening a body of glass of different refractive index to render it plastic, and pressing said segment down into said plastic body with said wall in substantially perpendicular relation to the face of said body.

7. The method of making a composite glass member which comprises forming a glass segment, coating one face of said segment with refractory material, softening a glass member and pressing the coated face of said segment into said member.

8. The method of making a composite button for ophthalmic lenses which comprises softening a piece of glass, forming a shaped glass segment, coating one face of said segment with a refractory material, pressing the coated face of said segment into said softened piece of glass, and pressing said piece of glass into a desired shape.

9. The method of making a composite button for multifocal lenses which comprises forming a glass segment, coating one face of said segment with refractory material, softening a glass member, pressing the coated face of said segment through the body portion of said member, and removing from said member the glass displaced by said segment.

WILLIAM BAUSCH.